US012669385B2

(12) United States Patent
Van Vlierberghe et al.

(10) Patent No.: US 12,669,385 B2
(45) Date of Patent: Jun. 30, 2026

(54) METHOD AND SYSTEM FOR DETERMINING A SERIES OF TEMPERATURE VALUES OF A MOLTEN METAL BATH

(71) Applicant: Heraeus Electro-Nite International N.V., Houthalen (BE)

(72) Inventors: Michel Van Vlierberghe, Houthalen (BE); Guido Neyens, Houthalen (BE)

(73) Assignee: HERAEUS ELECTRO-NITE INTERNATIONAL N.V., Houthalen (BE)

( * ) Notice: Subject to any disclaimer, the term of this patent is extended or adjusted under 35 U.S.C. 154(b) by 354 days.

(21) Appl. No.: 18/254,815

(22) PCT Filed: Dec. 1, 2021

(86) PCT No.: PCT/EP2021/083734
§ 371 (c)(1),
(2) Date: May 26, 2023

(87) PCT Pub. No.: WO2022/117629
PCT Pub. Date: Jun. 9, 2022

(65) Prior Publication Data
US 2024/0003758 A1 Jan. 4, 2024

(30) Foreign Application Priority Data
Dec. 2, 2020 (EP) ..................................... 20211293

(51) Int. Cl.
*G01K 11/32* (2021.01)

(52) U.S. Cl.
CPC .................................... *G01K 11/32* (2013.01)

(58) Field of Classification Search
CPC . G01K 11/32; G01J 5/026; G01J 5/048; G01J 5/0821; G01J 5/004
See application file for complete search history.

(56) References Cited

U.S. PATENT DOCUMENTS

| | | | |
|---|---|---|---|
| 7,878,016 B2* | 2/2011 | Rotem | ................ G06F 11/3058 |
| | | | 702/132 |
| 2014/0130636 A1 | 5/2014 | Lundh et al. | |
| 2016/0320245 A1* | 11/2016 | Herbron | ................ G01K 1/143 |
| 2017/0102256 A1* | 4/2017 | Sosna | .................... G01F 1/7044 |
| 2018/0180484 A1 | 6/2018 | Kendall et al. | |

FOREIGN PATENT DOCUMENTS

| | | | | | |
|---|---|---|---|---|---|
| CA | 2589377 A1 | * | 11/2007 | ................ | G01J 5/53 |
| CN | 104040311 B | * | 6/2017 | ............. | G01K 1/143 |
| CN | 107036731 A | * | 8/2017 | ............. | G01K 11/12 |
| DE | 20008622 U1 | * | 8/2000 | ................ | G01J 3/02 |

(Continued)

*Primary Examiner* — Laura Martin
*Assistant Examiner* — Julia Fitzpatrick
(74) *Attorney, Agent, or Firm* — Blank Rome LLP

(57) ABSTRACT

The present invention relates to a method and a system for determining a series of at least two temperature values of a molten metal bath with a device comprising an optical cored wire and a detector. The method according to the invention has been proven to be especially suitable for multiple repeated measurements, wherein a final end temperature of the molten metal bath shall be reached.

15 Claims, 4 Drawing Sheets

(56)                    References Cited

FOREIGN PATENT DOCUMENTS

| | | | |
|---|---|---|---|
| EP | 0646778 | A1 | 4/1995 |
| EP | 2799824 | B1 | 10/2019 |
| JP | H10185698 | A | 7/1998 |
| JP | 2009204556 | A * | 9/2009 |
| RU | 2416785 | C2 | 4/2011 |
| WO | 2016/026530 | A1 | 2/2016 |

* cited by examiner

30

50

METHOD AND SYSTEM FOR DETERMINING A SERIES OF TEMPERATURE VALUES OF A MOLTEN METAL BATH

The present invention relates to a method and a system for determining a series of at least two temperature values of a molten metal bath.

The temperature of a molten metal bath in a metallurgical vessel is a critical parameter during the metal making process, which determines the quality of the resulting product. A possible means for measuring the temperature of the molten metal bath, particularly of iron or steel in a melting environment of an electric arc furnace (EAF), involves immersing an optical fiber surrounded by a metal tube into the molten metal. An optical fiber surrounded by a metal tube is often also referred to as optical cored wire.

Since the heating of the metal melt is an energy-intensive process, it is desired to avoid an overheating of the molten metal; i.e. a heating above a critical temperature that allows an optimal processing of the melt.

For measuring the temperature of the molten metal bath, the optical cored wire can be fed into the metallurgical vessel. The leading tip of the optical cored wire is immersed into the molten metal bath, encountering on its way a hot atmosphere first, followed by a slag layer and then the molten metal bath. Once a portion of the optical cored wire is immersed below the surface of the molten metal bath, the optical fiber can convey thermal radiation received from the molten metal to a detector, e.g. a pyrometer. Suitable instrumentation can be associated with the detector for determining the temperature of the molten metal bath. During this measurement, the immersed portion of the optical cored wire may be partly or completely consumed by the molten metal bath. Once the temperature measurement has been concluded, the tip of the optical cored wire can be retracted from the molten metal bath. The tip of the retracted optical cored wire will become the new leading tip for the next temperature measurement.

Such a device is suitable for on-demand and semi-continuous temperature measurements in form of a series of immersion cycles. An operator can obtain a temperature measurement without any direct intervention with the harsh environment proximate to the metallurgical vessel.

To provide accurate measurements, blackbody conditions must be ensured in the vicinity of the immersed leading tip of the optical fiber while a measurement is obtained. The fiber must be immersed to a sufficient depth below the metal bath surface and at a location within the vessel which is representative for the temperature of the liquid metal bath. On the other hand, a deep immersion will increase the flotational forces on the optical cored wire and increase consumption of the optical cored wire during a measuring sequence.

Several prior art documents disclose feeding methods for a metal coated optical fiber to improve the data quality of a temperature measurement.

For example, US2018180484A1 discloses a method suitable for multiple measurement cycles and without the requirement of additional equipment. However, the disclosed method does not take into account the final state to be reached at the end of the melting process; i.e. the end temperature at which the melting process shall be ended. The constantly changing conditions, especially the rising temperature of the molten metal, during the metal making process are also not considered. This can result in needlessly many measurements or measurements taken at inappropriate points during the process.

US2014130636A1 discloses a method to control the melting processes in an electric arc furnace. Process parameters are obtained to determine the state of the process and the process is adapted based on the obtained parameters in accordance with pre-determined values for the parameters. While the optimization of the process itself is disclosed, an optimization of the application of accompanying measurements is not addressed.

In view of the prior art, there is the need for a measurement method and a system which consider the accompanying circumstances of a metal making process and an efficient way of using the method and the system.

The object of the present invention is thus to provide an improved method for determining a series of at least two temperature values of a molten metal bath which solves at least one of the problems discussed above. In particular, it is an object of the method according to the invention to provide a method which allows to accompany the metal making process until a final end temperature value is reached with the least number of temperature measurements. More particular, it is an object to provide a method that allows to avoid an overheating of the molten metal bath. Specifically, one of the objects is to provide a method, which allows to minimize the consumption of optical cored wire during a series of measurements.

A further object of the invention is to provide an improved system for determining a series of at least two temperature values of a molten metal bath.

These objects are attained by the subject-matter defined in the independent claims.

The invention provides a method for determining a series of at least two temperature values $T_{mes}(n)$ and $T_{mes}(n+1)$ of a molten metal bath with a device comprising an optical cored wire and a detector, the method comprising (a) supplying a model F(t) describing the temperature development of the molten metal bath with time;

(b) defining a critical temperature value $T_{cri}$;

(c) measuring a measured temperature value $T_{mes}(n)$ of the molten metal bath at a point in time t(n);

(d) determining a fitted heating rate $R_{heat}(n)$ based on the model F(t), the critical temperature value $T_{cri}$ and the measured temperature value $T_{mes}(n)$, wherein $R_{heat}(n)$ is defined as $$R_{heat}(n) = \Delta T_{heat}(n)/\Delta t;$$

(e) calculating a point in time $t_{cal}(n+1)$ based on the temperature difference $\Delta T(n)$ between the critical temperature value $t_{cri}$ and the measured temperature value $T_{mes}(n)$ and the fitted heating rate $R_{heat}(n)$, wherein $$\Delta T(n) = T_{cri} - T_{mes}(n) \text{ and}$$

$$t_{cal}(n+1) = t(n) + (\Delta T(n)/R_{heat}(n));$$

(f) measuring a measured temperature value $T_{mes}(n+1)$ of the molten metal bath at the point in time $t_{cal}(n+1)$.

Furthermore, the invention provides a system for determining a series of at least two temperature values $T_{mes}(n)$ and $T_{mes}(n+1)$ of a molten metal bath, wherein the system comprises a device and a module and the module is adapted to interact with the device, wherein the device comprises an optical cored wire and a detector, wherein the module comprises a storage unit, a processing unit and a controlling unit, wherein the storage unit comprises (a1) a storage element for supplying a model F(t) describing the temperature development of the molten metal bath with time;

(a2) a storage element for defining a critical temperature value $T_{cri}$; wherein the processing unit comprises (b1) a processing element for determining a fitted heating rate $R_{heat}$ based on a model F(t), a critical temperature value $T_{cri}$ and a measured temperature value $T_{mes}$, wherein $R_{heat}$ is defined as $$R_{heat} = \Delta T_{heat}/\Delta t;$$

(b2) a processing element for calculating a point in time $t_{cal}$ based on a temperature difference $\Delta T$ between a critical temperature value $t_{cri}$ and a measured temperature value $T_{mes}$ and a fitted heating rate $R_{heat}$, wherein $$\Delta T = T_{cri} - T_{mes} \text{ and}$$

$$t_{cal} = t + (\Delta T/R_{heat});$$

and wherein the controlling unit comprises (c1) a controlling element for measuring a temperature value $T_{mes}$ of the molten metal bath.

Preferred embodiments are defined in the dependent claims. The preferred embodiments may be realized individually or in any possible combination.

The method according to the invention has been proven to be especially suitable for multiple repeated measurements, wherein a final end temperature of the molten metal bath shall be reached. Typically, the temperature of the molten metal rises between measurements due to continued heating and an overheating, i.e. a heating above the final end temperature to be reached, shall be avoided. Additionally, the method has been proven to support an efficient application of several measurements to guide a heat to the final end temperature; i.e. to ensure that this target temperature is reached at the end of the process. In other words, also an underheating at the point of finalization of the process can be avoided. Furthermore, the inventive method allows an optimum in timing and number of measurements, which leads to an optimized minimal consumption of the optical cored wire. The term "consumption" as used herein refers to a disintegration of the optical cored wire, such as for example the melting and dissolution of the optical cored wire by and into the molten metal bath, a decomposition or burning of the whole optical cored wire or its different parts, and the like.

The invention provides a method for determining a series of at least two temperature values $T_{mes}(n)$ and $T_{mes}(n+1)$. A series of temperature values is used herein to describe a determination which is repeated at least once. The series of temperature values comprises at least the temperature values $T_{mes}(n)$ and $T_{mes}(n+1)$. Beyond $T_{mes}(n)$ and $T_{mes}(n+1)$ further temperature values may be determined.

Throughout this application variables related to temperatures or temperature values will be referred to with a upper-case T, while variables related to points in time, durations or time in general will be referred to with a lower-case t.

A variable without a designated index, i.e. (n) or (n+1) or the like, will be used to define the variable in general. A variable with a designated index will be used to refer to this variable for in a specific context. For example, $T_{mes}$ refers to the general definition of the measured temperature value $T_{mes}$, while $T_{mes}(n)$ refers to a specific measured temperature value.

According to the invention, the temperature values $T_{mes}$ can be determined by measuring the temperature. The temperature measurement can, for example, be a single point or be a multiple point measurement and the possible related data processing.

The measured temperature value $T_{mes}(n)$ is understood as a temperature value which is obtained by a measurement at a specific point in time t(n). Accordingly, the temperature value $T_{mes}(n+1)$ is a temperature value which is obtained at a specific point in time t(n+1).

As used herein, the term "molten metal bath" describes a melt in a vessel. An alternative term for "molten metal bath" known to a skilled person is "metal melt". The molten metal of the molten metal bath is not particularly restricted. According to a preferred embodiment, the molten metal is molten steel. The term molten metal bath does not exclude the presence of any solid or gaseous parts, including for example non-molten parts of the respective metal. The molten metal bath may be covered with a slag layer.

The temperature of metal melts differs and usually depends on the composition of the metal and the stage of the melting process. According to a preferred embodiment, the temperature of the molten metal bath is in the range of 1500-1800° C. and more preferably in the range of 1500-1700° C.

The molten metal bath may be contained in a vessel comprising an entry point, suitable to feed an optical cored wire through. Such an entry point may be positioned in a side-wall panel or a roof covering the vessel.

According to the invention, the at least two temperature values $T_{mes}(n)$ and $T_{mes}(n+1)$ are determined with a device comprising an optical cored wire. Preferably, the optical cored wire is an optical fiber laterally surrounded by a metal tube. Preferably, the optical fiber is a flexible, transparent fiber. Optical fibers are most often used as means to transmit light, especially in the IR wavelength range, between the two ends of the fiber. Preferably, the optical fiber is formed from glass or plastic, more preferably quartz glass. Preferably, the optical fiber is selected from the group consisting of graded index fibers and single-mode step index fibers.

The metal tube surrounding the optical fiber can fully encircle the optical fiber or it can be at least partially open so that the casing is not fully encircling the optical fiber.

Preferably, the metal of the metal tube surrounding the optical fiber is iron or steel, preferably stainless steel.

In a preferred embodiment the linear density of the optical cored wire is in the range of 25-g/m, more preferably in the range of 35-70 g/m. The linear density is defined by the mass per unit length.

Preferably, the optical cored wire is laterally surrounded by at least one additional metal tube, i.e. at least two metal tubes surround the optical fiber laterally. More preferably, the optical cored wire is centrally arranged in the at least one additional metal tube.

Preferably, the at least one additional metal tube is not in contact with the optical cored wire. More preferably, the void space between these at least two metal tubes is at least partially filled with a material selected from the group consisting of gaseous or solid materials or a combination thereof. The solid material is preferably selected from the group consisting of inorganic materials, natural polymers, synthetic polymers and combinations thereof. The gaseous material is preferably a gas or a mixture of gases. More preferably, the gas is air or an inert gas.

According to a preferred embodiment, the optical cored wire comprises a plurality of separating elements arranged in the at least one metal tube, forming at least one compartment between the separating elements. Here, the term "compartment" relates to the volume between the different separating elements in the tube. The term "separating elements" relates to parts arranged inside the tube subdividing the volume within the tube. Preferably, separating elements are disc-shaped elements that are arranged inside the tube comprising an opening, through which the optical cored wire is extending and which can at least partly support the optical cored wire. The material of the separating elements is preferably selected from the group consisting of silicone, preferably two-component silicone, rubber, leather, cork, metal and combinations thereof.

The optical cored wire is optionally surrounded by at least one additional layer. This at least one additional layer may or may not replace said at least one additional metal tube. In a preferred embodiment, this at least one additional layer comprises a plurality of pieces, more preferably the layer comprises fibers.

In a further preferred embodiment, the material of the at least one additional layer has the form of a web, a net, a woven or a knitted structure.

Preferably, the at least one additional layer comprises a non-metallic material, most preferably an organic material.

It is to be understood that the optical cored wire may comprise any combination of the above described configurations. For example, it may be advantageous, that the optical cored wire is laterally surrounded by an additional layer and a second metal tube.

The device used to apply the method according to the invention further comprises a detector. The detector is coupled to one end of the optical cored wire and receives a light signal, in particular in the IR wavelength range, transmitted by the optical fiber. Preferably, the detector in the context of the present invention is a pyrometer.

The optical cored wire has an immersion end and an opposite end. The leading tip of the optical cored wire is the tip of the immersion end of the optical cored wire. Preferably, when the method according to the invention is applied, the optical cored wire is consumed in the direction from the immersion end towards the opposite end and after each measuring sequence, another part of the optical cored wire will be the immersion end; i.e. after each measurement sequence the leading tip is newly generated. The opposite end is connected to the detector and will not be consumed during a measurement.

In step (a) of the method according to the present invention a model F(t) describing the temperature development of the molten metal bath with time is supplied.

The model F(t) describing the temperature development of the molten metal bath with time is a model defining a relationship between time and temperature; i.e. it is adapted to predict a temperature at a certain point in time. In a typical melting process, the time is directly related to the electrical energy input.

Since the model F(t) describes the development of the temperature of the molten metal bath with time, its first derivative F'(t) can be interpreted as the change of the temperature with time.

In other words, and in case of an increasing temperature development, the first derivative F'(t) of the model F(t) preferably represents the heating rate R of the molten metal bath with time and can be represented as $$R=F'(t)=\Delta T/\Delta t,$$

wherein $\Delta T$ represents a temperature change and $\Delta t$ represents a time duration.

Preferably, the model F(t) describes the maximum temperatures for the development of the temperature of the molten metal bath with time; i.e. a maximum heating rate R for every temperature value is assumed. In other words, the temperature of the molten metal bath will not rise faster than this maximum heating rate at the given temperature.

In an exemplary embodiment, the first derivative F'(t) of the model describing the temperature development of the molten metal bath with time F(t) is a linear function.

Preferably, the model F(t) describing the temperature development of the molten metal bath with time comprises mathematical equations, characteristic curves or other information defining the relations between time and temperature of the molten metal bath. It may contain relations describing the physical properties of the molten metal bath, the characteristics of the metallurgical facility and the corresponding model parameters. Preferably, the physical properties of the molten metal bath are considered in the model F(t).

Preferably, the model F(t) is derived by a method selected from the group of numerical methods, analytical methods, experimental methods and combinations thereof.

Preferably, the model F(t) describing the temperature development of the molten metal bath with time is based on recorded measurements, i.e. data obtained in previous melting processes.

In a preferred embodiment, an estimated or measured temperature value may be the only input parameter for the model F(t) describing the temperature development of the molten metal bath with time. In further examples, further input parameters may be utilized. Preferably, such a further input parameter may be an operational parameter. Operational parameters in this context are the parameters which define the melting process, as for example the electrical energy input.

In a preferred embodiment, the model F(t) describing the temperature development of the molten metal bath with time is derived by a method comprising the steps (i) providing a set of data relating characteristics of a molten metal bath with recorded data for models F(t) for the development of the temperature of a molten metal bath with time;

(ii) providing characteristics of the molten metal bath;

(iii) receiving a model F(t) describing the temperature development of the molten metal bath with time from the provided set of data relating characteristics of the molten metal bath corresponding to the provided characteristics of the molten metal bath.

Preferably, a set of data comprises data pairs in which one certain value of a type of data is assigned to a certain value of another type of data. More preferably, it comprises data pairs in which one certain value of a type of data is assigned to a model, a sequence of several steps or the like.

In step (b) of the method according to the present invention a critical temperature value is defined.

A "critical temperature value $T_{cri}$" is to be understood as a fixed temperature value. Preferably, the critical temperature value $T_{cri}$ is a pre-determined temperature of the molten metal bath above which a further determination of the temperature value is not further required. Such a critical temperature may for example be the target temperature of the molten metal bath, at which a finalization of the melting process will be initiated. This temperature is also known as target tapping temperature, since the last step of the metal making process, the tapping, is initiated when this temperature is reached by the molten metal bath.

In step (c) of the method according to the present invention a measured temperature value $T_{mes}(n)$ of the molten metal bath is measured at a point in time t(n).

The measurement of the temperature value $T_{mes}(n)$ results in the determination of the temperature value $T_{mes}(n)$ of the molten metal bath at the point in time t(n).

To measure a temperature value $T_{mes}$, the radiation emitted by the molten metal bath, especially in the IR wavelength range, and conveyed by the optical cored wire to the detector is recorded. The intensity and/or spectral information of the radiation may be processed by a processing unit connected to the detector. The leading tip of the optical cored wire is preferably immersed under the surface of the molten metal bath at the point in time the temperature is obtained.

Preferably, the determination of a measured temperature value $T_{mes}$ comprises the measurement of a single data point or the measurement of more than one data point; i.e. the measurement of a series of data points.

Preferably, a measured temperature value $T_{mes}$ is the mean value of the series of data points. More preferably, the determined temperature value is derived based on the application of an algorithm processing the series of data points.

Preferably, a measured temperature value $T_{mes}$ is determined by the application of a measurement profile MP.

Preferably, the measured temperature value $T_{mes}(n)$ is determined by the application of a measurement profile MP(n).

A measurement profile MP is to be understood as a sequence of steps which are carried out to obtain a value of interest. In the context of the present invention, the value of interest is the temperature of the molten metal bath.

In a preferred embodiment, the measurement profile MP defines at least one of the steps of
  (i) providing the leading tip of the optical cored wire above the surface of the molten metal bath;
  (ii) feeding the leading tip of the optical cored wire for a time period from t0 to t2 with at least one feeding velocity $v_{fed}$ towards the molten metal bath and below the surface of the molten metal bath, wherein the leading tip of the optical cored wire is below the surface of the molten metal bath during a time period from t1 to t2;
  (iii) obtaining temperature information within a measuring time period within t1 to t2;
  (iv) retracting the leading tip of the optical cored wire with a velocity v ret to a position above the molten metal bath.

In other words, it is preferred that the measurement profile MP defines at least the steps (i) and/or (ii) and/or (iii) and/or (iv). Preferably, the measurement profile MP defines the steps (i), (ii), (iii) and (iv).

It is to be understood, that t1 and t2 are later than t0 and t2 is later than t1. t1 is the point in time the leading tip enters the molten metal bath; i.e. the point in time from which it is immersed below the surface of the molten metal bath. t2 is the point in time after which the leading tip is retracted towards a position above the surface of the molten metal bath.

Preferably, steps (i), (ii) and (iv) are performed in consecutive order.

Preferably, step (iii) is at least partly performed during step (ii).

The skilled person will understand that "providing the leading tip" and "feeding the leading tip" necessarily includes providing and feeding the optical cored wire, i.e. providing the optical cored wire having a leading tip and moving the optical cored wire with its leading tip.

It is to be understood, that the feeding velocity $v_{fed}$ refers to the average velocity of the leading tip during its feeding towards and below the surface of the molten metal bath.

The surface of the molten metal bath can be the surface facing the surrounding of the vessel or, in case of the presence of a slag layer, the surface facing the slag layer.

In a preferred embodiment, the feeding in step (ii) of a measurement profile MP comprises at least two feeding velocities $v_{fed}1$ and $v_{fed}2$. It is to be understood, that the feeding velocities $v_{fed}1$ and $v_{fed}2$ refer to average velocities the leading tip of the optical cored wire is fed with.

Preferably, the feeding in step (ii) of a measurement profile MP comprises a feeding velocity $v_{fed}1$ with which the leading tip is fed during t0 to t1 and a second feeding velocity $v_{fed}2$ with which the leading tip is fed during t1 to t2.

According to a preferred embodiment, the measurement profile MP defines a further step within a stationary time period within t1 to t2, during which the feeding of the leading tip of the optical cored wire is paused with or the leading tip of the optical cored wire is fed with a low speed. The term "pausing with the feeding of the leading tip" used herein means, that the leading tip is not actively moved. Both alternatives, a pausing of the feeding or a feeding with a low speed, result in a movement of the position of the leading tip towards the surface of the molten metal bath due to the consumption. Nevertheless, the leading tip is still immersed below the surface of the molten metal bath.

A low speed is preferably lower than 0.2 m/s, more preferably lower than 0.1 m/s.

In step (d) of the method according to the present invention a fitted heating rate $R_{heat}(n)$ based on the model F(t), the critical temperature value $T_{cri}$ and the measured temperature value $T_{mes}(n)$ is determined, wherein $R_{heat}(n)$ is defined as $$R_{heat}(n)=\Delta T_{heat}(n)/\Delta t.$$

The fitted heating rate $R_{heat}(n)$ can be understood as the heating rate which is expected in average from the temperature value $T_{mes}(n)$ until the critical temperature is reached. In other words, $R_{heat}(n)$ is to be understood as the change in temperature $\Delta T_{heat}(n)$ expected in a time duration $\Delta t$.

It is to be understood, that the model F(t) can be applied in such a way, that the point in time $t_{cri}$ related to the critical temperature value $T_{cri}$ can be determined.

According to a preferred embodiment, the fitted heating rate $R_{heat}(n)$ is determined based on a linear fit of the model F(t). More preferably, the fitted heating rate $R_{heat}(n)$ is determined based on a linear fit of the model F(t) between the point in time $t_{cri}$ and the point in time t(n).

Preferably, the fitted heating rate $R_{heat}(n)$ is determined based on the first derivatives of the model F(t) for the point in time $t_{cri}$ and the point in time t(n). More preferably, the fitted heating rate $R_{heat}(n)$ is determined by the average of the first derivatives of the model F(t) for the point in time $t_{cri}$ and the point in time t(n).

According to a preferred embodiment, the fitted heating rate $R_{heat}(n)$ is determined based on a model for the heating rate of the molten metal bath R(T), which is based on the first derivatives of the model F(t) for the point in time $t_{cri}$, the point in time t(n) and the measured temperature value $T_{mes}(n)$.

In step (e) of the method according to the present invention a point in time $t_{cal}(n+1)$ is calculated based on the temperature difference $\Delta T(n)$ between the critical temperature value $T_{cri}$ and the measured temperature value $T_{mes}(n)$ and the fitted heating rate $R_{heat}(n)$, wherein $$\Delta T(n)=T_{cri}-T_{mes}(n)$$

and $$t_{cal}(n+1)=t(n)+(\Delta T(n)/R_{heat}(n)).$$

Step (e) results in the prediction of a future point in time $t_{cal}(n+1)$, at which the critical temperature value $T_{cri}$ would be reached if the temperature development of the molten metal bath would follow the fitted heating rate $R_{heat}(n)$ determined in step (d).

Preferably, the fitted heating rate $R_{heat}(n)$ is higher than the real heating rate of the molten metal bath. Accordingly, the temperature of the molten metal bath will be lower than the critical temperature $T_{cri}$ at the future point in time $t_{cal}(n+1)$.

In step (f) of the method according to the present invention a measured temperature value $T_{mes}(n+1)$ of the molten metal bath is measured at a point in time $t(n+1)$.

The measurement of the temperature value $T_{mes}(n+1)$ results in the determination of the temperature value $T_{mes}(n+1)$ of the molten metal bath at the point in time $t(n+1)$.

Preferably, the measured temperature value $T_{mes}(n+1)$ is determined by the application of a measurement profile $MP(n+1)$.

Preferably, the feeding velocity $v_{fed}$ of measurement profile $MP(n+1)$ is the higher, the higher the measured temperature value $T_{mes}(n)$.

Preferably, the duration of the time period from t1 to t2 of measurement profile $MP(n+1)$ is the shorter, the higher the measured temperature value $T_{mes}(n)$.

Preferably, steps (c) to (f) are performed in consecutive order.

Preferably, step (a) is performed prior to step (c), more preferably prior to step (d), most preferably prior to step (e).

Preferably, the method is performed in one of the following orders:

(a)-(b)-(c)-(d)-(e)-(f),
(b)-(a)-(c)-(d)-(e)-(f),
(b)-(c)-(a)-(d)-(e)-(f) or
(b)-(c)-(d)-(a)-(e)-(f).

Preferably, step (b) is performed prior to step (a), more preferably prior to step (c), most preferably prior to step (d).

Preferably, the method is performed in one of the following orders:

(b)-(a)-(c)-(d)-(e)-(f),
(a)-(b)-(c)-(d)-(e)-(f) or
(a)-(c)-(b)-(d)-(e)-(f).

Preferably, the method is carried out multiple times. More preferably, the method is carried out multiple times until a critical temperature value is reached by the molten metal bath.

Preferably, the method comprises the steps (g)-(i):

(g) Determining a fitted heating rate $R_{heat}(n+1)$ based on the model $F(t)$, the critical temperature value and the measured temperature value $T_{mes}(n+1)$, wherein $R_{heat}(n+1)$ is defined as $$R_{heat}(n+1)=\Delta T_{heat}(n+1)/\Delta t;$$

(h) calculating a point in time $t_{cal}(n+2)$ based on the temperature difference $\Delta T(n)$ between the critical temperature value $T_{cri}$ and the temperature value $T_{mes}(n)$ and the fitted heating rate $R_{heat}(n)$, wherein $$\Delta T(n+1)=T_{cri}-T_{mes}(n+1) \text{ and}$$

$$t_{cal}(n+2)=t(n+1)+(\Delta T(n+1)/R_{heat}(n+1));$$

(i) measuring a measured temperature value $T_{mes}(n+2)$ of the molten metal bath at the point in time $t_{cal}(n+2)$.

Preferably, the fitted heating rate $R_{heat}(n+1)$ is higher than the fitted heating rate $R_{heat}(n)$; i.e. the temperature difference $\Delta T_{heat}(n+1)$ is bigger than the temperature difference $\Delta T_{heat}(n)$.

Preferably, steps (g) to (i) are performed in consecutive order.

Preferably, steps (g) to (i) are performed after steps (a) to (f).

Preferably, the method is performed in one of the following orders:

(a)-(b)-(c)-(d)-(e)-(f)-(g)-(h)-(i),
(b)-(a)-(c)-(d)-(e)-(f) (g)-(h)-(i),
(b)-(c)-(a)-(d)-(e)-(f) (g)-(h)-(i), or
(b)-(c)-(d)-(a)-(e)-(f) (g)-(h)-(i).

The invention furthermore provides a system for determining a series of at least two temperature values $T_{mes}(n)$ and $T_{mes}(n+1)$ of a molten metal bath, the system comprising a device and a module, wherein the module is adapted to interact with the device.

Preferably, the system is configured to perform the method according to the invention, wherein the method comprises the following steps (a) supplying a model $F(t)$ describing the temperature development of the molten metal bath with time;

(b) defining a critical temperature value $T_{cri}$;

(c) measuring a measured temperature value $T_{mes}(n)$ of the molten metal bath at a point in time $t(n)$;

(d) determining a fitted heating rate $R_{heat}(n)$ based on the model $F(t)$, the critical temperature value $T_{cri}$ and the measured temperature value $T_{mes}(n)$, wherein $R_{heat}(n)$ is defined as $$R_{heat}(n)=\Delta T_{heat}(n)/\Delta t;$$

(e) calculating a point in time $t_{cal}(n+1)$ based on the temperature difference $\Delta T(n)$ between the critical temperature value $T_{cri}$, the temperature value $T_{mes}(n)$ and the fitted heating rate $R_{heat}(n)$, wherein $$\Delta T(n)=T_{cri}-T_{mes}(n) \text{ and}$$

$$t_{cal}(n+1)=t(n)+(\Delta T(n)/R_{heat}(n));$$

(f) measuring a measured temperature value $T_{mes}(n+1)$ of the molten metal bath at the point in time $t_{cal}(n+1)$.

For preferred embodiments related to the inventive method, it is referred to the preferred embodiments given above.

The system according to the invention comprises a device, wherein the device comprises an optical cored wire and a detector. For preferred embodiments related to the optical cored wire and the detector it is referred to the preferred embodiments given above.

The system according to the invention comprises a module, wherein the module comprises a storage unit, a processing unit and a controlling unit.

Preferably, the storage unit, the processing unit and the controlling unit are configured to interact with each other.

According to the invention, the storage unit of the module comprises (a1) a storage element for supplying a model $F(t)$ describing the temperature development of the molten metal bath with time and (a2) a storage element for defining a critical temperature value $T_{cri}$.

According to the invention, the processing unit of the module comprises (b1) a processing element for determining a fitted heating rate $R_{heat}$ based on a model $F(t)$, a critical temperature value $T_{cri}$ and a measured temperature value $T_{mes}$, wherein $R_{heat}$ is defined as $$R_{heat}=\Delta T_{heat}/\Delta t;$$

(b2) a processing element for calculating a point in time $t_{cal}$ based on a temperature difference $\Delta T$ between a critical temperature value $T_{cri}$ and a measured temperature value $T_{mes}$ and a fitted heating rate $R_{heat}$, wherein $$\Delta T = T_{cri} - T_{mes} \text{ and}$$

$$t_{cal} = t + (\Delta T / R_{heat}).$$

In a preferred embodiment, the processing unit is configured to process the information stored in the storage unit.

According to the invention, the controlling unit of the module comprises (c1) a controlling element for measuring a temperature value $T_{mes}$ of the molten metal bath.

In a preferred embodiment, the controlling unit is configured to control the device.

In a preferred embodiment, the system comprises feeding means. In the context of the present invention, feeding means may be understood as means which allow the feeding of the optical cored wire into the molten metal bath. Such means may be selected from the group consisting of a feeder, a feeding control, a straightener and a guiding tube.

According to a preferred embodiment, the system further comprises a coil, which accommodates the length of the optical cored wire.

The idea underlying the invention shall subsequently be described in more detail with respect to the embodiments shown in the figures. It should be understood, however, that the invention is not limited to the precise arrangements and instrumentalities shown. Herein:

Figure 1:
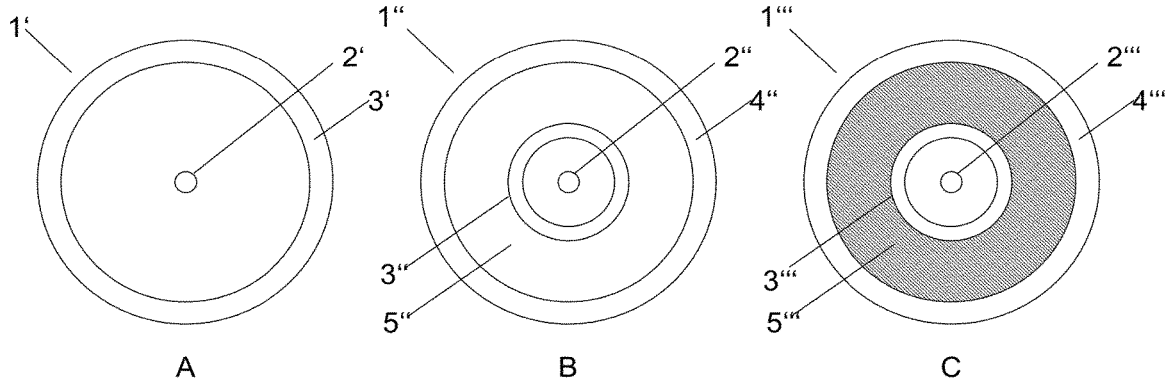
FIG. 1 shows schematic cross-sectional views of different designs of optical cored wires.

FIG. 1 shows schematic cross-sectional views of different designs of optical cored wires in accordance with exemplary embodiment of the invention. FIG. 1A shows an optical cored wire 1' which comprises an optical fiber 2' surrounded by a metal tube 3'.

FIG. 1B shows an optical cored wire 1" which comprises an optical fiber 2" surrounded by a metal tube 3". A second metal tube 4" additionally surrounds metal tube 3". The void space between the two metal tubes 5" is not filled with a solid material; i.e. the void space may comprise a gas or a gas mixture.

FIG. 1C shows an optical cored wire 1''' which comprises an optical fiber 2''' surrounded by a metal tube 3''' and a second metal tube 4'''. The void space between the two metal tubes 5''' is filled with a filler material, for example fibers from an organic material or e-glass.

Figure 2:
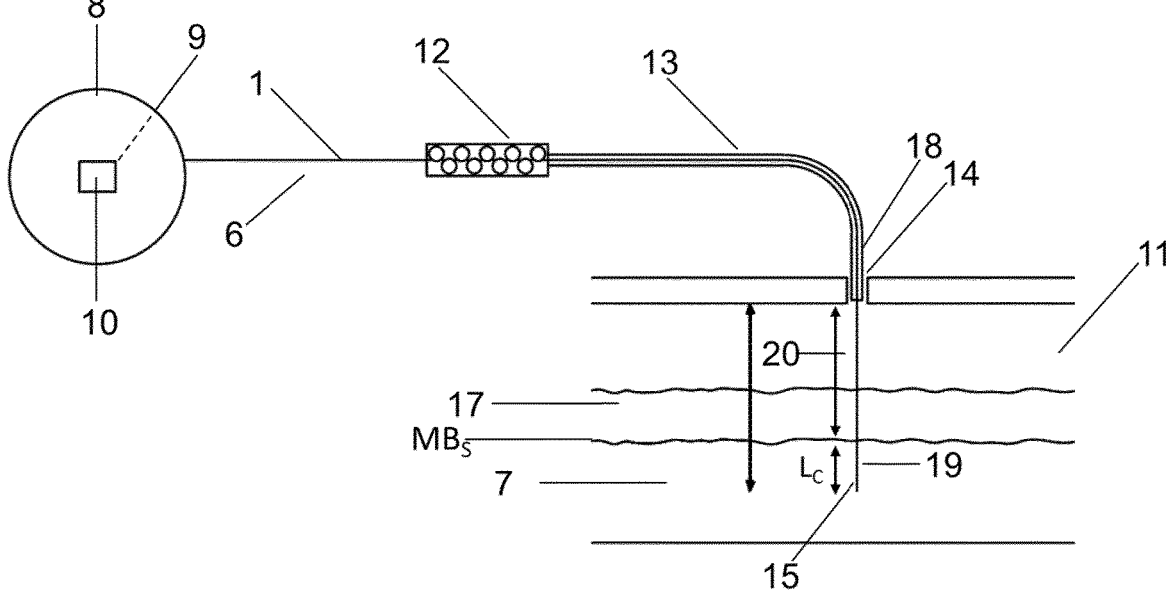
FIG. 2 shows a schematic view of an exemplary installation 6 with a molten metal bath 7, of which the temperature shall be determined.

FIG. 2 shows a schematic view of an exemplary installation 6 with a molten metal bath 7, of which the temperature shall be determined.

The installation 6 comprises an optical cored wire 1 which is located at least partly on a coil 8 and is at least in part unwound from the coil 8 for conducting a measurement. One end of the optical cored wire 9 is connected to a detector 10 which in turn could be connected to a computer system (not shown) to process the data obtained with the optical cored wire 1 and the detector 10. The molten metal bath 7 is contained in a vessel 11 which may be an electric arc furnace, a ladle, a tundish or any vessel known to those skilled in the art for the processing of molten metal. The optical cored wire 1 is led by means of a feeder 12 through a guide tube 13 in the vessel 11 having an entry point 14. The shown configuration is used as an example, a roof with a respective entry point is not a pre-requisite for the present invention.

The configuration shown illustrates an exemplary measurement position of the optical cored wire 1 with the leading tip 15 immersed below the surface of the molten metal bath MBs. The angle of immersion of the optical cored wire 1 with respect to the surface of the molten metal bath MBs is 90° in the presented embodiment. However, the angle can vary depending on the construction details of the metallurgical facility.

The temperature of a part of the optical cored wire 1 extending from the coil 8 to the entry point of the vessel 14 can be considered to be low, which could be a temperature ranging from room temperature up to 100° C. Once passing the entry point 14 in the direction of the molten metal bath 7, a hot atmosphere of up to 1700° C. or even higher is first encountered, followed by a slag layer 17 which is in turn followed by the molten metal bath 7. The entry point 14 to the vessel could be equipped with a blowing lance 18 to prevent metal and slag penetration into the guiding tube 13.

To obtain a temperature measurement, the optical cored wire 1 is fed with its leading tip at the immersion end 15 towards the molten metal bath 7 to the required immersion depth. In order to obtain reliable temperature measurements, it may be desired to measure at a more or less fixed immersion depth in the molten metal bath. A suitable feeding system 12 will accurately control the feeding velocity of the optical cored wire 1.

After the measurement sequence, the part of the optical cored wire immersed in the molten metal bath 19 will be molten and thereby consumed. The length of this part is indicated with $L_C$. After the measurement is taken, the part of the optical cored wire 20 located in the hot atmosphere and extending through the slag layer can be fed back into the direction of the coil 8 and can be reused for the next measurement.

Since the temperature of the molten metal bath 7 is a critical process parameter, a detailed knowledge of its development during the metal making process is desired and the process is accompanied by a series of measurements. In a typical EAF process, the temperature of the molten metal will increase with a lower rate at lower temperature than at higher temperatures. At the low temperature range the molten metal bath will still contain unmolten parts, while at the higher temperature range the metal bath contains homogeneous molten metal. Accordingly, the complete energy input is directed to the heating of the material and is not consumed by the melting of solid parts.

Temperature measurement are usually obtained after the flat bath is reached, for most steel typically above temperature values of 1500° C. The heating rate in this temperature is typically in the order of 10° C./min. In the temperature range of the typical target tapping temperature, typically 1650° C., the heating rate can increase up to 80° C./min, depending on the energy input.

Figure 3:
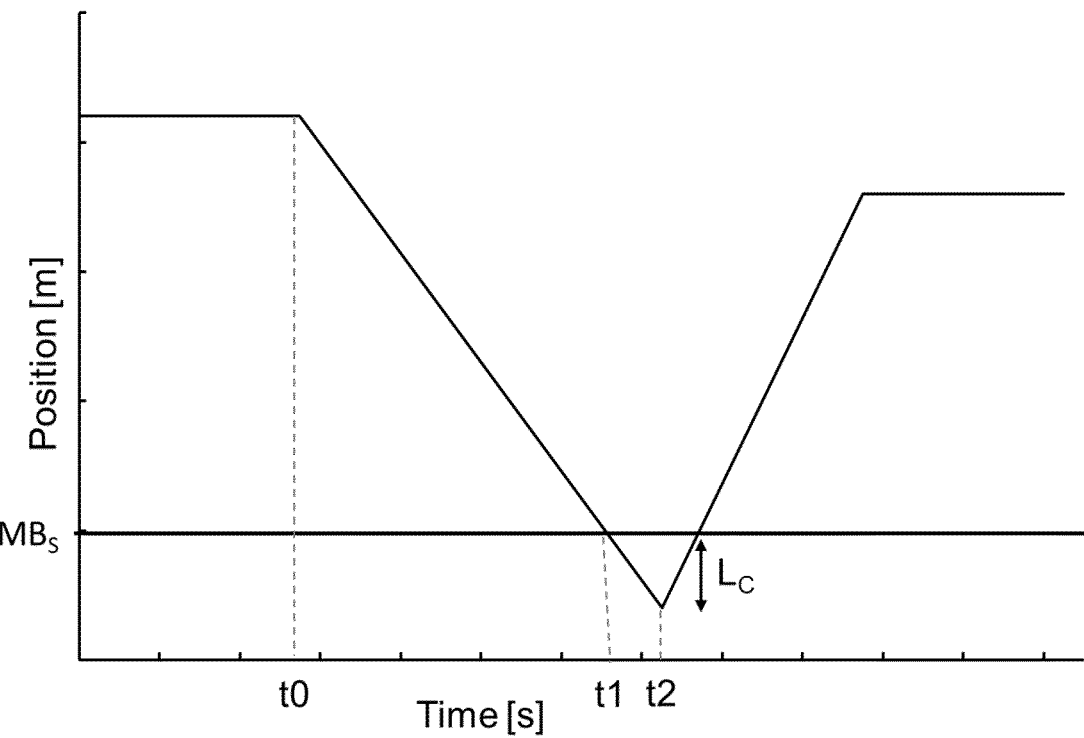
FIG. 3 shows a position-time graph indicating the immersion of the leading tip of the optical cored wire during the application of a representative measurement profile.
Figure 4:
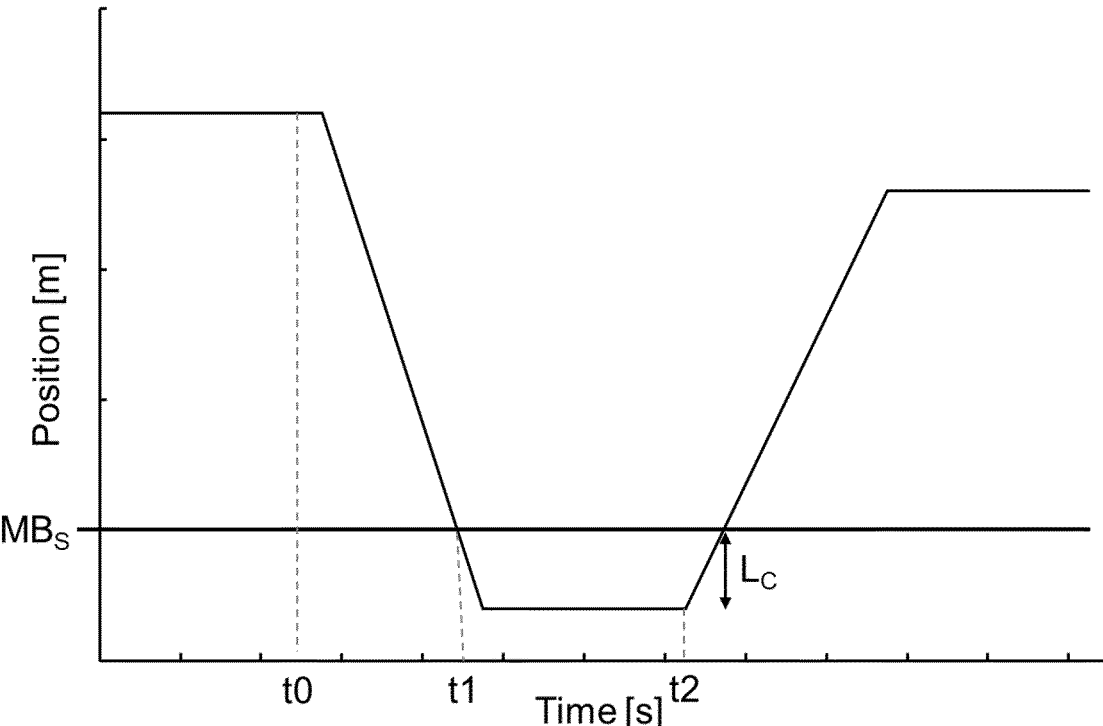
FIG. 4 shows a position-time graph indicating the immersion of the leading tip of the optical cored wire during the application of another representative measurement profile.

FIG. 3 shows a position-time graph indicating the immersion of the leading tip of the optical cored wire during the application of a representative measurement profile. The x-axis shows the time, whereas the y-axis indicates the position of the leading tip. The position of the surface of the molten metal bath MBs is indicated for orientation. Prior to the start of a measurement; i.e. prior to t0, the leading tip is positioned at a starting point. This may be inside the metallurgical vessel and proximate the entry point; i.e. close to the point where the optical cored wire enters the vessel. The optical cored wire is fed for a duration from t0 to t2 with a feeding velocity towards and into the molten metal bath. This duration is typically in the range of seconds. The leading tip of the optical cored wire enters the molten metal bath at a point in time t1, i.e. t1 is the point in time from which the leading tip is immersed below the surface of the molten metal bath. In the shown graph, a single feeding velocity is applied, but the feeding may comprise several phases with different feeding velocities. Even a phase without feeding; i.e. a pausing phase, can be included during the conduction of a measurement as indicated in the graph shown in FIG. 4, representing another preferred embodiment. The temperature measurement is obtained during a measurement time period during t1 to t2. The leading tip has to be immersed under the surface of the molten metal bath to obtain reliable measurements. Temperature values obtained in an early phase of the feeding may often be not representative for the bulk temperature of the molten metal bath. After t2, the optical cored wire is retracted from the molten metal bath back to a position above the surface. Ideally, the part of the optical cored wire immersed under the surface of the molten metal bath $L_C$ is consumed until t2.

The required time for a complete consumption of the immersed part of the optical cored wire to the surface of the molten metal bath is dependent on the temperature of the molten metal and the characteristics of the optical cored wire. The said characteristics of the optical cored wire affecting its melting or consumption behavior include its design and the materials it is made of. For example, a metal tube with a higher wall thickness will melt slower than a metal tube of the same material with a thinner wall thickness. In any case, a measurement is always linked to the consumption of a certain part of the optical cored wire. Accordingly, minimizing the number of measurements minimizes the amount of consumed optical cored wire.

Figure 5:
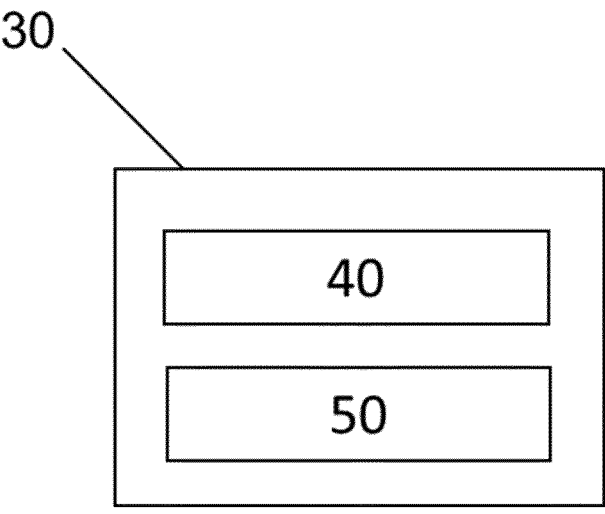
FIG. 5 shows a schematic view of a system according to an embodiment of the invention.

FIG. 5 shows a schematic view of a system 30 according to an embodiment of the invention, configured to carry out the inventive method. Accordingly, the system 30 is configured to supply a model describing the temperature development of a molten metal bath with time. The system 30 is further configured to define a critical temperature; for example, a target temperature of the molten metal bath. Furthermore, the system 30 is configured to determine a heating rate, based on the input of the critical temperature, a measured temperature and a model describing a time dependent temperature development of the molten metal bath. The system 30 is further adapted to calculate a point in time, based on a first point in time, the determined heating rate and a temperature difference. Additionally, the system 30 is configured to measure a temperature value.

Figure 6:
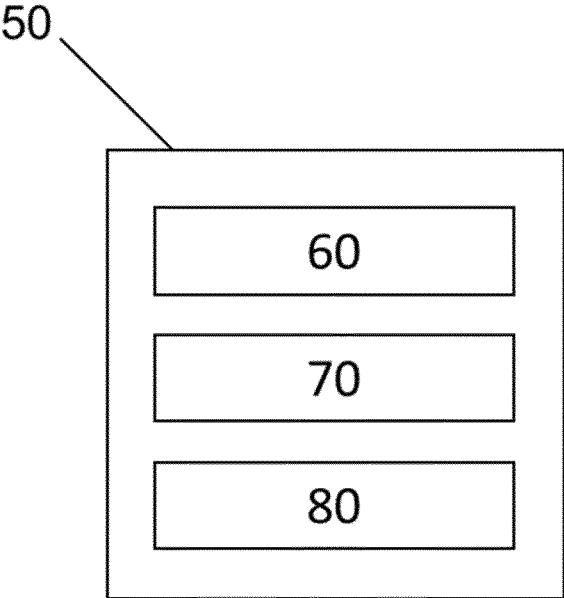
FIG. 6 shows a schematic view of a module according to an embodiment of the invention.

The system comprises a device 40, the device comprises an optical cored wire and a detector. Furthermore, the system comprises a module 50. FIG. 6 shows a schematic of the module 50 in more detail. The module 50 comprises a storage unit 60, a processing unit 70 and a controlling unit 80.

In the following, exemplary conditions according to the inventive method will be given.

Example

A device comprising an optical cored wire was installed in a representative electric arc furnace (EAF) installation according to FIG. 2. The optical cored wire comprised a graded index fiber with a core diameter of 50 μm and a stainless-steel tube with an outer diameter of 1.3 mm. The fiber with metal tube was embedded in a stainless-steel tube with an outer diameter of 6 mm and a wall thickness of 0.3 mm.

Figure 7:
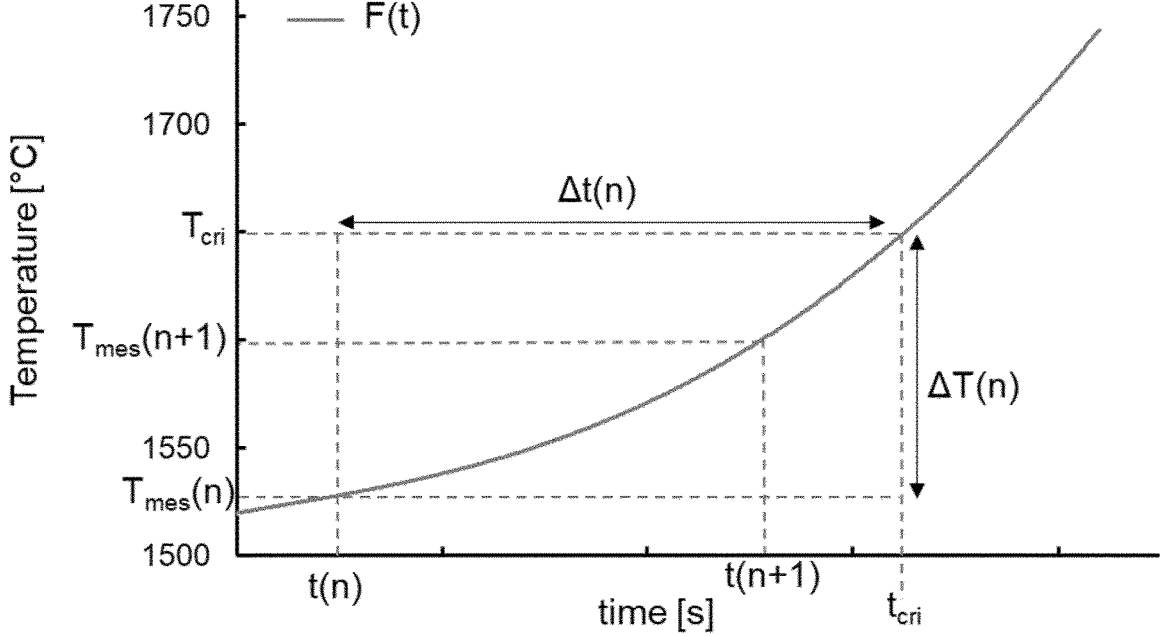
FIG. 7 shows a graph illustrating the method according to an exemplary embodiment of the invention.

The EAF was loaded with scrap and the melting process was initiated. A tapping temperature of 1650° C. ($T_{Cri}$) was targeted. FIG. 7 shows the expected development of the temperature with time for the specific metallurgical facility with the applied process parameter. The underlying model is based on a maximum expected increase in temperature as recorded from previous processes. Based on the consumed accumulated power of the EAF, a first measurement was initiated determining a temperature value of 1520° C. ($T_{mes}$ (n) at the point in time designated with t(n) in FIG. 7). Based the temperature difference $\Delta T$(n) of 130° C. from the measured temperature to the critical temperature and the expected time of 4 min ($\Delta t$(n) until $t_{Cri}$) until the tapping temperature would be reached according to the expected temperature development, an average heating rate $R_{heat}$(n) of 32.5° C./min was expected. Accordingly, the point in time for the next measurement t(n+1) was set 4 min after the first measurement.

The second measurement determined a temperature value of 1600° C. ($T_{mes}$(n+1) at the point in time designated with t(n+1) in FIG. 7). A third measurement would be set 43 s after this second measurement, according to a temperature difference of 50° C. and an expected point in time 43 s after the second measurement to reach the target tapping temperature; i.e. an expected heating rate of 70° C./min.

LIST OF REFERENCE NUMERALS 1, 1', 1", 1''' Optical cored wire
2', 2", 2''' Optical fiber
3', 3", 3''' Metal tube
4", 4''' Second metal tube
5", 5''' Void space between metal tubes
6 Installation
7 Molten metal bath
8 Coil
9 Opposite end (end of cored wire connected to detector)
10 Detector
11 Vessel; metallurgical container
12 Feeder
13 Guide tube
14 Entry point
15 Leading tip of optical cored wire
MBs Surface of molten metal bath
17 Slag layer
18 Blowing lance
19 Part of the cored wire immersed in the molten metal bath
$L_C$ Length of optical cored wire immersed in the molten metal bath
20 Part of cored wire subjected to hot atmosphere and slag 30 System
40 Device
50 Module
60 Storage unit
70 Processing unit
80 Controlling unit

The invention claimed is:

1. A method for determining a series of at least two temperature values $T_{mes}(n)$ and $T_{mes}(n+1)$ of a molten metal bath with a device comprising an optical cored wire and a detector, wherein a leading tip of the optical cored wire is immersed under the surface of the molten metal bath at a point in time a temperature of the molten metal bath is obtained, the method comprising:

(a) supplying a model F(t) describing the temperature development of the molten metal bath with time;

(b) defining a critical temperature value $T_{cri}$;

(c) measuring a measured temperature value $T_{mes}(n)$ of the molten metal bath at a point in time t(n);

(d) determining a fitted heating rate $R_{heat}(n)$ based on the model F(t), the critical temperature value $T_{cri}$ and the measured temperature value $T_{mes}(n)$, wherein $R_{heat}(n)$ is defined as:

$$R_{heat}(n) = \Delta T_{heat}(n)/\Delta t;$$

(e) calculating a point in time $t_{cal}(n+1)$ based on the temperature difference $\Delta T(n)$ between the critical temperature value $T_{cri}$ and the measured temperature value $T_{mes}(n)$ and the fitted heating rate $R_{heat}(n)$, wherein:

$$\Delta T(n) = T_{cri} - T_{mes}(n); \text{ and, } t_{cal}(n+1) = t(n) + (\Delta T(n)/R_{heat}(n)); \text{ and}$$

(f) measuring a measured temperature value $T_{mes}(n+1)$ of the molten metal bath at the point in time $t_{cal}(n+1)$.

2. The method according to claim 1, wherein the method further comprises:

(g) determining a fitted heating rate $R_{heat}(n+1)$ based on the model F(t), the critical temperature value $T_{cri}$ and the measured temperature value $T_{mes}(n+1)$, wherein $R_{heat}(n+1)$ is defined as:

$$R_{heat}(n+1) = \Delta T_{heat}(n)(n+1)/\Delta t;$$

(h) calculating a point in time $t_{cal}(n+2)$ based on the temperature difference $\Delta T(n)$ between the critical temperature value $T_{cri}$ and the measured temperature value $T_{mes}(n)$ and the fitted heating rate $R_{heat}(n)$, wherein:

$$\Delta T(n+1) = T_{cri} - T_{mes}(n+1); \text{ and}$$

$$t_{cal}(n+2) = t(n+1) + (\Delta T(n+1)/R_{heat}(n+1)); \text{ and}$$

(i) measuring a measured temperature value $T_{mes}(n+2)$ of the molten metal bath at the point in time $t_{cal}(n+2)$.

3. The method according to claim 2, wherein the fitted heating rate $R_{heat}(n+1)$ is higher than the fitted heating rate $R_{heat}(n)$.

4. The method according to claim 1, wherein the model F(t) describes the maximum temperatures for the development of the temperature of the molten metal bath with time.

5. The method according to claim 1, wherein the first derivative of the model F(t) describing the temperature development of the molten metal bath with time is a linear function.

6. The method according to claim 1, wherein the model F(t) describing the temperature development of the molten metal bath with time is based on previous measurements.

7. The method according to claim 1, wherein the model F(t) describing the temperature development of the molten metal bath with time is based on operational parameters.

8. The method according to claim 1, wherein the fitted heating rate $R_{heat}(n)$ is determined based on a linear fit of the model F(t).

9. The method according to claim 1, wherein the fitted heating rate $R_{heat}(n)$ is determined based on the first derivatives of the model F(t) for the point in time tori and the point in time t(n).

10. The method according to claim 1, wherein the model F(t) describing the temperature development of the molten metal bath with time is derived by a method comprising the steps of:

(i) providing a set of data relating characteristics of a molten metal bath with recorded data for the development of the temperature of a molten metal bath with time;

(ii) providing characteristics of the molten metal bath; and, (iii) receiving a model F(t) describing the temperature development of the molten metal bath with time from the provided set of data relating characteristics of the molten metal bath corresponding to the provided characteristics of the molten metal bath.

11. The method according to claim 1, wherein a measured temperature value $T_{mes}$ is determined by the application of a measurement profile MP, the measurement profile MP comprising at least one of the following steps to obtain the temperature of the molten metal bath:

(i) providing the optical cored wire with its leading tip above the surface of the molten metal bath;

(ii) feeding the leading tip of the optical cored wire for a time period from t0 to t2 with at least one feeding velocity $V_{fed}$ towards the molten metal bath and below the surface of the molten metal bath, wherein the leading tip of the optical cored wire is below the surface of the molten metal bath during a time period from t1 to t2;

(iii) obtaining temperature information within a measuring time period within t1 to t2; and (iv) retracting the optical cored wire with a velocity $v_{ret}$ to a position above the molten metal bath.

12. The method according to claim 11, wherein the measurement profile MP further defines a step within a stationary time period within t1 to t2, during which the feeding of the leading tip of the optical cored wire is paused with or the leading tip of the optical cored wire is fed with a low speed.

13. The method according to claim 11, wherein the feeding of step (ii) is defined by at least two feeding velocities $v_{fed}1$ and $v_{fed}2$.

14. A system for determining a series of at least two temperature values $T_{mes}(n)$ and $T_{mes}(n+1)$ of a molten metal bath comprising a device and a module and the module is adapted to interact with the device, wherein the device comprises an optical cored wire and a detector, the system configured to immerse a leading tip of the optical cored wire under the surface of the molten metal bath at a point in time a temperature of the molten metal bath is to be obtained, wherein the module comprises a storage unit, a processing unit and a controlling unit, wherein the storage unit comprises:

(a1) a storage element for supplying a model F(t) describing the temperature development of the molten metal bath with time;

(a2) a storage element for defining a critical temperature value $T_{cri}$, wherein the processing unit comprises:

(b1) a processing element for determining a fitted heating rate $R_{heat}$ based on a model F(t), a critical temperature value $T_{cri}$ and a measured temperature value $T_{mes}$, wherein $R_{heat}$ is defined as:

$$R_{heat} = \Delta T_{heat} / \Delta t;$$

(b2) a processing element for calculating a point in time $t_{cal}$ based on a temperature difference $\Delta T$ between a critical temperature value $T_{cri}$ and a measured temperature value $T_{mes}$ and a fitted heating rate $R_{heat}$, wherein:

$$\Delta T = T_{cri} - T_{mes} \text{ and } t_{cal} = t + (\Delta T / R_{heat}); \text{ and,}$$

wherein the controlling unit comprises:

(c1) a controlling element for measuring a temperature value $T_{mes}$ of the molten metal bath.

15. The system of claim 14, wherein the optical cored wire has a linear density in a range of from 35 to 70 g/m.

\* \* \* \* \*